OR  4,008,951

United St

Himmelsbach

[11] 4,008,951
[45] Feb. 22, 1977

[54] CONTROL MECHANISM FOR OPTICAL SYSTEM WITH INDEPENDENTLY MOVABLE COMPONENTS

[75] Inventor: Paul Himmelsbach, Bad Kreuznach, Germany

[73] Assignee: Jos. Schneider & Co. Optische Werke Kreuznach, Bad Kreuznach, Germany

[22] Filed: May 27, 1975

[21] Appl. No.: 580,568

[30] Foreign Application Priority Data

May 28, 1974 Germany .......................... 2425645

[52] U.S. Cl. ................................................. 350/187
[51] Int. Cl.² ......................................... G02B 15/16
[58] Field of Search ............................. 350/187, 44

[56] References Cited

UNITED STATES PATENTS 2,782,683  2/1957  Walker .............................. 350/187

Primary Examiner—Paul A. Sacher
Attorney, Agent, or Firm—Karl F. Ross; Herbert Dubno

[57] ABSTRACT

A varifocal objective with two independently movable components is adjustable by a reversible master motor positively coupled with a screw drive for one component and with a movable part of a position sensor which emits pulses of varying density during displacement of that component for the stepping of a reversible slave motor driving the other component according to a predetermined positional relationship. The position sensor may comprise a movable scanner, e.g. a slotted disk, coacting with a fixed carrier of optically readable markings such as a glass rod; alternatively, it may include a movable signal carrier such as a perforated tape coacting with a stationary reader. If the second component is to move bidirectionally upon unidirectional displacement of the first one, the carrier is provided with a supplemental track coacting with a separate pick-up head to control a reversing switch in the operating circuit of the slave motor.

8 Claims, 4 Drawing Figures

Fig. 1a
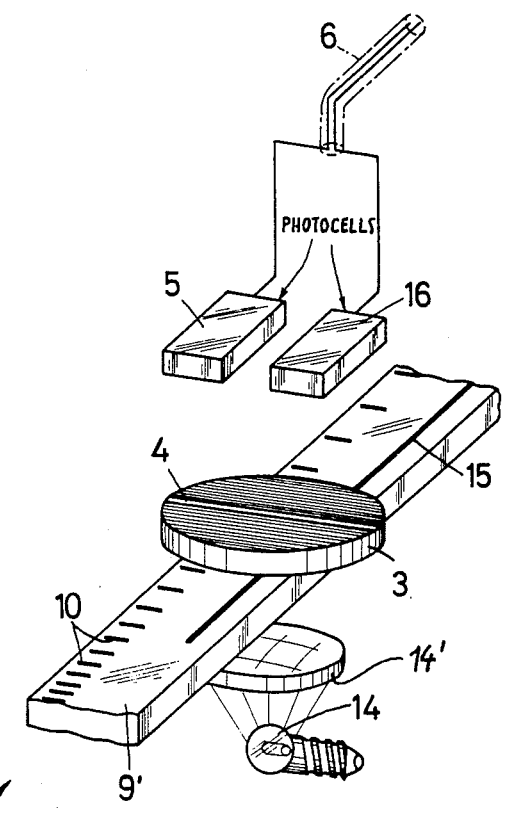
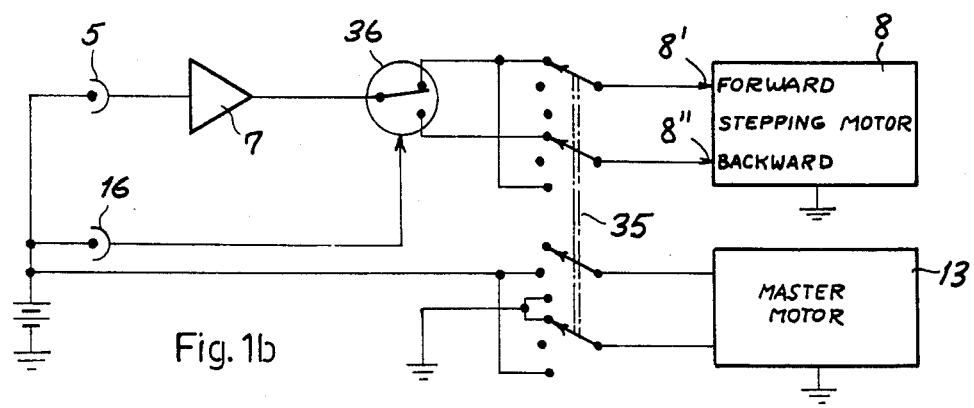
Fig. 1b

CONTROL MECHANISM FOR OPTICAL SYSTEM WITH INDEPENDENTLY MOVABLE COMPONENTS

FIELD OF THE INVENTION

My present invention relates to a control mechanism for two or more independently movable components of an optical system, such as a pair of lenses or lens groups of a varifocal objective that must be axially shifted at different rates to provide a zooming effect.

BACKGROUND OF THE INVENTION

The movable components of conventional zoom objectives are controlled by camming slots or the like in a rotatable drive member, usually a sleeve centered on the objective axis. The machining of the requisite camming grooves is complicated and relatively expensive; their coaction with respective cam followers gives rise to considerable frictional resistance, especially in certain positions in which one component may undergo a reversal of motion with reference to the other component, which results in rapid wear and consequent optical inaccuracies.

OBJECT OF THE INVENTION

The object of my present invention, therefore, is to provide an improved control mechanism for the purpose described which obviates these drawbacks and enables precise adjustment, over an extended range, of the shiftable components of varifocal objectives or other optical systems.

SUMMARY OF THE INVENTION

In accordance with my present invention, I provide first and second transmission means mechanically independent of each other for the displacement of a first and a second optical component, respectively. The first transmission means is positively coupled with a master drive means, such as a motor or a hand crank, for automatic or manual displacement of the first component together with a movable member of a position scanner which emits a series of pulses of varying density upon a movement of this member at a given speed over a predetermined range. The second transmission means is positively coupled with a slave drive means which is linked with the output of the position scanner by an operating circuit supplying it with the emitted pulses so that the simultaneous displacement of the two optical components occurs according to a predetermined positional relationship therebetween. If more than two components are to be independently displaced in this manner, the position scanner must have several outputs delivering different trains of pulses to their respective slave drive means.

In many instances the follower component undergoes a reversal of motion at one or more points in the range during monotonous displacement of the leader component. In such cases, according to a further feature of my invention, I provide the position scanner with an ancillary output for control signals operating a reversing switch which selectively applies the position-indicating pulses to either a forward-stepping or a backward-stepping input of the slave drive means. This relative reversal of motion is independent of a change in the direction of the leader component which requires the simultaneous switching of both drive means.

The movable member of the position scanner may be either a carrier of markings or a sensor coacting with such a carrier. For high-precision scanning I prefer to use a solid, stationary rod as the carrier, e.g. of glass or metal; in the case of a glass or other transparent rod, provided with optical markings such as thin opaque lines, scanning may be effected photoelectrically by translumination. Suitable movable carriers include perforated or magnetic tapes.

BRIEF DESCRIPTION OF THE DRAWING

The above and other features of my invention will now be described in detail with reference to the accompanying drawing in which:

FIG. 1a is a perspective view of a position scanner included in the system of FIG. 1;

FIG. 1b shows an operating circuit for a pair of drive motors included in the system.

SPECIFIC DESCRIPTION

Figure 1:
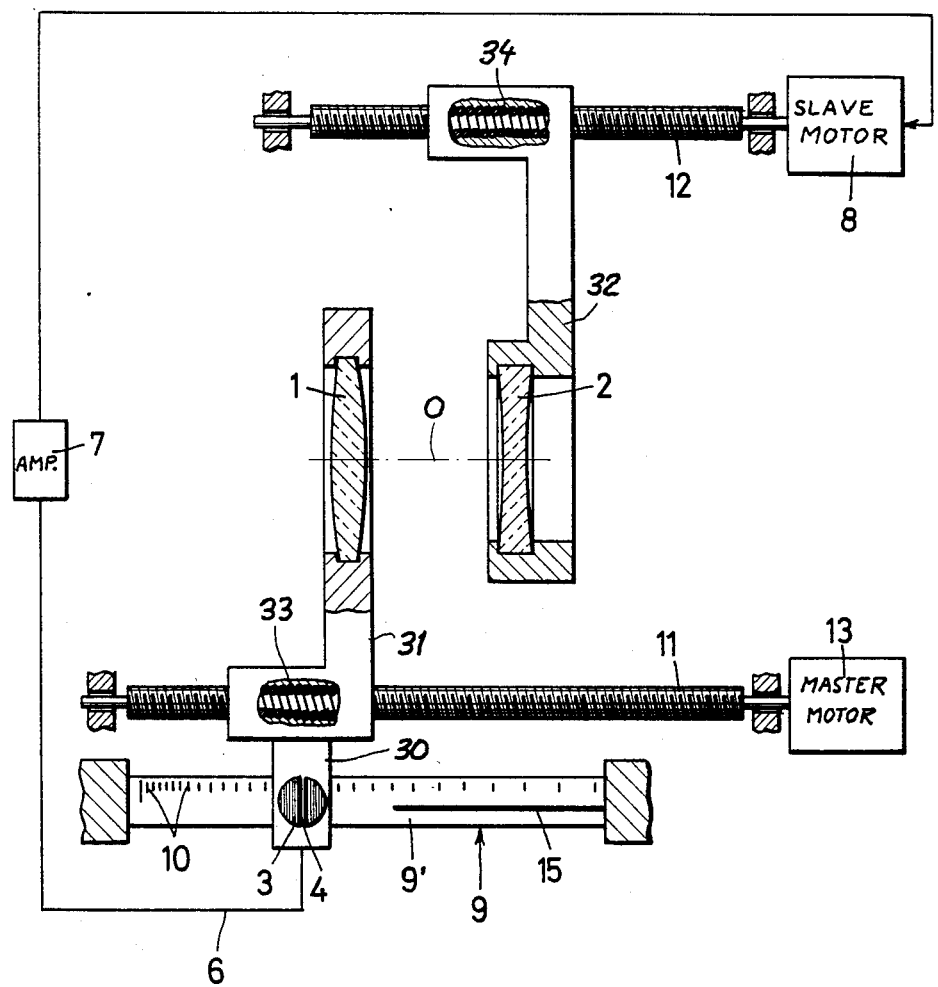
FIG. 1 is a diagrammatic view of a control mechanism embodying my invention.

In FIG. 1 I have shown at 1 and 2 a pair of lenses, centered on an axis 0, which constitute two independently movable components of a conventional varifocal or zoom objective not further illustrated. The displacement of lens 1 with reference to other, fixed components (not shown) changes the focal length of the objective whereas a compensatory shifting of lens 2 maintains the image plane in fixed position.

Lens 1 has a mounting 31 which is supported and guided on a first leadscrew 11 driven by a master motor 13; in an analogous manner, a mounting 32 for lens 2 coacts with a second leadscrew 12 driven by a slave motor 8. The two mountings 31, 32 are coupled with their respective leadscrews via bearings 33, 34 of the recirculating-ball type.

Mounting 31 is integral with an arm 30 forming part of a position scanner 9, this arm carrying an opaque disk 3 which is provided with a transverse slot 4 constituting a narrow window for the viewing of opaque markings 10 on a transparent glass rod 9' paralleling the leadscrews 11, 12. As seen in FIG. 1a, a lamp 14 transluminates the rod 9' through a lens 14' which may be cylindrically curved and serves to focus the image of the light source on the upper glass surface carrying the markings 10. A longitudinal mark 15, also opaque, extends over part of the rod 9' underneath disk 3 to provide a direction-indicating signal. Two photocells 5 and 16, overlying the disk 3, respectively detect the alignment of slot 4 with any mark 10 and the presence or absence of line 15 beneath that slot. The output signals of these two photocells are conveyed via a cable 6 and an amplifier 7 to an input of slave motor 8 which I prefer to design as a stepping motor turning through a predetermined angular increment in response to each pulse applied thereto.

As shown in FIG. 1b, stepping motor 8 has a forward input 8' and a backward input 8" which are alternately energizable from photocell 5 via amplifier 7, by a main switch 35 and a reversing switch 36 in cascade therewith; these switches may, of course, be of the electronic type. Main switch 35 has two parts controlling the direction of motion of master motor 13 and slave motor 8, respectively; reversing switch 36 controls only the motor 8 to alter its sense of rotation relative to that of motor 13. Switch 36 responds to the output of photocell 16 which causes the two leadscrews 11, 12 to turn codirectionally in one part of the range, e.g. the one marked by the line 15, and in opposite directions in the remainder of the range.

Electrical or electromagnetic rather than optical scanning may be performed, e.g. with the aid of an inductive pick-up coil, if the markings 10 are metallic deposits.

Figure 2:
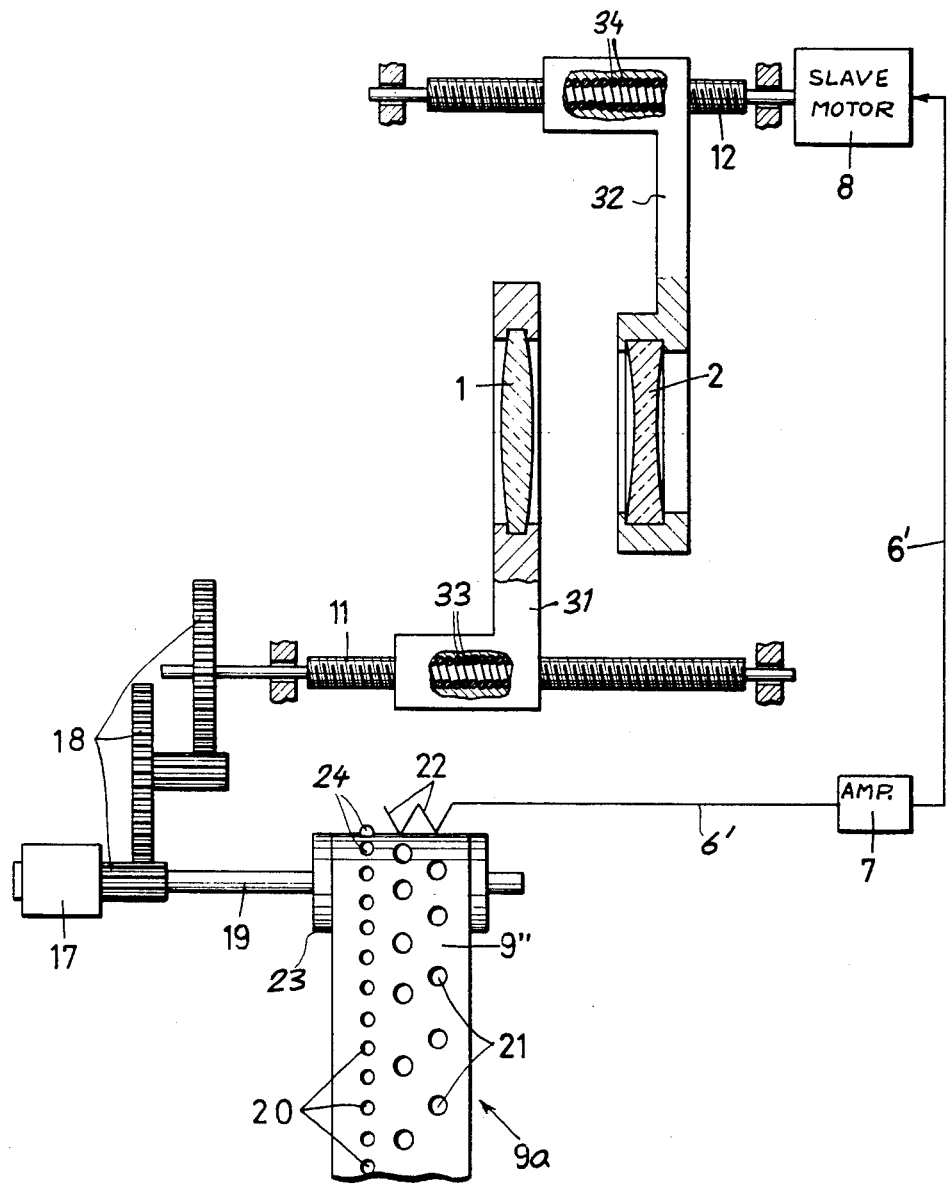
FIG. 2 is a view similar to FIG. 1, illustrating a modification.

FIG. 2 shows a modified system wherein a main or master motor 17 drives the leadscrew 11 through a set of reducing gears 18 and simultaneously rotates, via a shaft 19, a roller 23 around which an endless perforated tape 9'' is wound, this tape forming part of a modified position scanner 9a. Equispaced perforations 20 are engaged by teeth 24 of roller 23 whereas holes 21 coact with contact brushes 22 in an input lead 6' of motor 8 containing the amplifier 7. The holes 21 are shown to be staggered in two rows for greater density where a higher pulse rate is required. An additional set of holes or a throughgoing slot, sensed by a different contact brush, may be provided to generate a reversing signal analogous to that produced by the photocell 16 in the system of FIG. 1.

If a linear motor is used in lieu of stepping motor 8, spindle 12 is replaced by a reciprocating bar rigid with or secured to mounting 32 so that ball bearing 34 is eliminated.

I claim:

1. A control mechanism for simultaneously displacing a plurality of components of an optical system according to a predetermined positional relationship therebetween, comprising:

first transmission means for the displacement of a first optical component;

second transmission means mechanically independent of said first transmission means for the displacement of a second optical component;

master drive means positively coupled with said first transmission means;

reversible slave drive means positively coupled with said second transmission means and provided with two inputs energizable for movement in opposite directions;

position-scanning means including a movable member positively coupled with said master drive means for displacement in step with said first optical component, said position-scanning means being provided with first output means emitting a series of stepping pulses of varying density upon a movement of said member at a given speed over a predetermined range, said position-scanning means being further provided with second output means emitting a control signal in certain parts of said range; and circuit means linking said output means with said slave drive means for operating same under the control of said stepping pulses, said circuit means including a switch operatively coupled to said second output means for applying said stepping pulses to one of said inputs in the presence of said control signal and to the other of said inputs in the absence thereof.

2. A control mechanism as defined in claim 1 wherein said master and slave drive means are a pair of reversible motors.

3. A control mechanism as defined in claim 2 wherein said first and second transmission means comprise a pair of leadscrews.

4. A control mechanism as defined in claim 3 wherein said leadscrews are provided with recirculating-ball bearings coupling same with said first and second components, respectively.

5. A control mechanism as defined in claim 1 wherein said position-scanning means comprises a stationary carrier of optical markings, said movable member being provided with a narrow window individually registering with said markings.

6. A control mechanism as defined in claim 5 wherein said carrier is a transparent rod, said markings being opaque lines on said rod, said position-scanning means further comprising a light source juxtaposed with said rod and photoelectric means aligned with said window for illumination through said rod upon nonregistry of said window with any of said lines.

7. A control mechanism as defined in claim 1 wherein said movable member is a signal carrier and said output means includes stationary reading means coacting with said signal carrier.

8. A control mechanism as defined in claim 7 wherein said signal carrier is a perforated tape.

* * * * *